Sept. 29, 1936. O. J. GERSCHEFSKI 2,055,762
MOLDING APPARATUS
Filed April 3, 1934 2 Sheets-Sheet 1
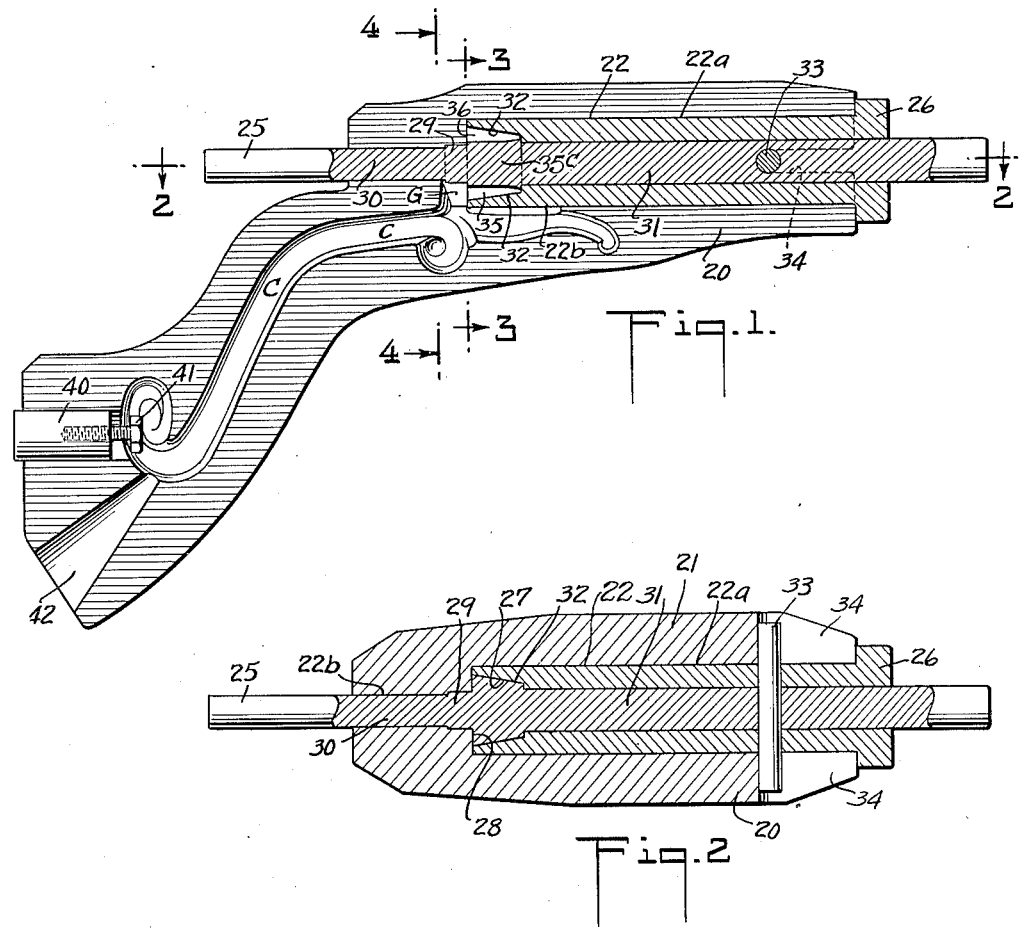
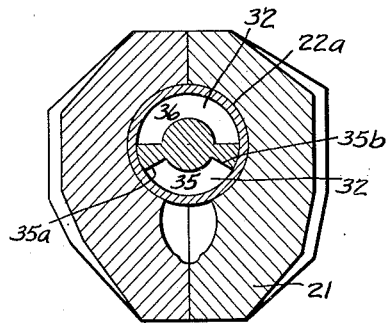
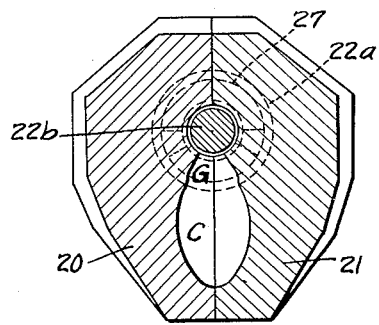
INVENTOR
OTTO J. GERSCHEFSKI
BY
ATTORNEY Sept. 29, 1936.  O. J. GERSCHEFSKI  2,055,762
MOLDING APPARATUS
Filed April 3, 1934  2 Sheets-Sheet 2
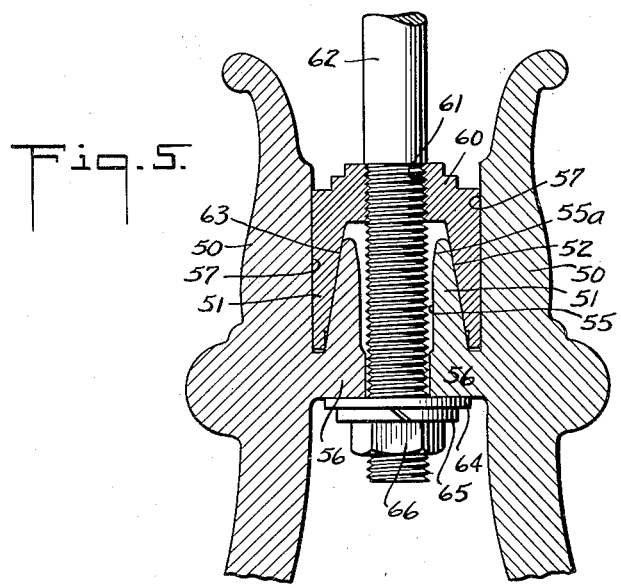
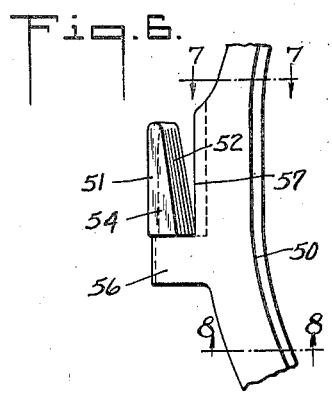
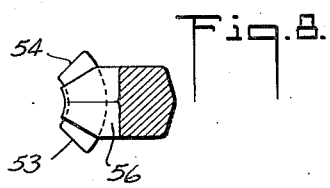
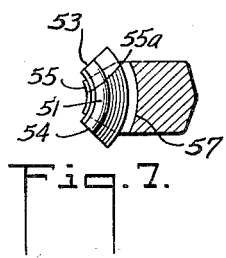
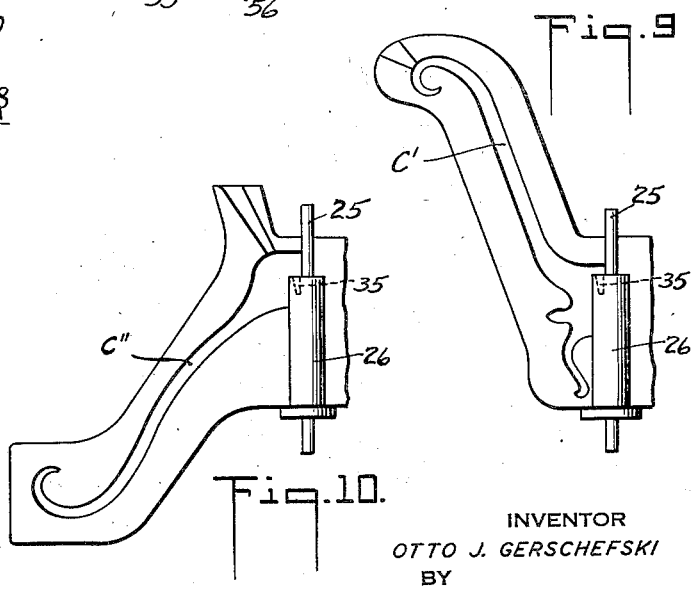
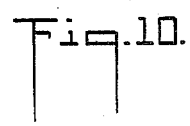
INVENTOR
OTTO J. GERSCHEFSKI
BY
ATTORNEY Patented Sept. 29, 1936

2,055,762

UNITED STATES PATENT OFFICE 2,055,762

MOLDING APPARATUS

Otto J. Gerschefski, Meriden, Conn., assignor to The Herco Art Manufacturing Company, Meriden, Conn., a corporation of Connecticut Application April 3, 1934, Serial No. 718,817

12 Claims. (Cl. 22—165)

The present invention relates to molding apparatus and methods of making the same and is more particularly directed toward the provision of metal molds whereby parts of standardized shape and dimension may be produced in castings of various forms, sizes, and ornamental shapes.

In certain arts, such as lighting fixtures, lamp bases, metal furniture, and the like, it is desirable to have a number of uniformly shaped arms or legs radiating from a central point. These arms or legs are in the form of separate castings and some means is necessary for securing them together.

The present invention contemplates the provision of molding apparatus whereby the legs or arms may have standardized securing lugs formed integral therewith, so that a standardized assembly is possible. This class of merchandise uses two, three, four, five or six legs or arms, depending upon the design and, according to the present invention, standardized lugs are provided which have different angular extent depending upon whether the complete assemblage is to have two, three, four, five or six legs or arms, as the case may be. These lugs differ only in their angular extent so that no change need be made in the parts with which they are to be assembled. The same body which is to receive a two arm arrangement will receive a three arm, four arm, five arm or six arm arrangement provided only that the castings originally made have lugs of the proper angular extent.

The most simple form of device for a body member for securing these arms or legs about an axis is of cylindrical shape with a tapered inner opening adapted to receive the lugs. To fit this form of body member, the castings are provided with conically shaped lugs and have a cylindrical portion to fit the outside of the body.

The design of lugs suitable for this purpose requires resort to shapes which cannot be produced by a simple two part mold for undercuts, and the shapes necessitate overhanging parts which could not be produced in such simple molds.

According to the present invention, the molds in which the various castings are to be made are constructed to have a core opening of standardized shape and dimension so that the same size of core opening is found in all the molds, irrespective of the design of the casting to be produced. All the molds are also provided with standardized gates extending from the ornamental part of the casting forming cavity to the core cavity. A standardized core is used which will fit the core cavity of any set of molds and this standardized core is provided with a pocket communicating with the gate opening so that metal can flow into the core pocket and produce a lug of standardized size and shape. Core pockets are made to produce lugs occupying 180°, 120°, 90°, 72°, or 60° so as to provide lugs adapted to occupy ½, ⅓, ¼, ⅕, or ⅙ of the circle.

It will thus be apparent that it is necessary to make up only one set of metal cores for all the molds in which it is contemplated that castings shall be made having these standardized lugs. The present invention also contemplates that the cores shall be so designed that one core structure will provide two or more such cavities or pockets.

Other and further objects will appear as the description proceeds.

The accompanying drawings show, for purposes of illustrating the present invention, one of the many embodiments in which the invention may take form, together with modifications of certain parts, it being understood that the drawings are illustrative of the invention rather than limiting the same. In these drawings:

Figure 1 is a plan view showing one of a pair of metal mold halves for casting a leg or arm and illustrating the core in cross-section.

Fig. 2 is a longitudinal sectional view taken on the line 2—2 of Figure 1, showing both mold halves and the core.

Fig. 3 is a sectional view taken on the line 3—3 of Figures 1 and 2, illustrating a core for forming lugs for three-armed and two-armed articles.

Fig. 4 is a section taken on the line 4—4 of Figures 1 and 2, illustrating the gate opening and casting cavity.

Fig. 5 is a longitudinal sectional view through a body member and assemblage with a number of arms.

Figs. 6, 7, and 8 are fragmentary elevational views showing a mounting lug for a casting designed for a four arm structure, Fig. 7 being taken in the direction of the arrow 7 of Fig. 6, and the Fig. 8 being taken in the direction of the arrow 8 in the Fig. 6; and Figs. 9 and 10 are diagrammatic views illustrating molds for making other shapes of castings with the standardized mounting lug.

The mold halves 20 and 21 are made of bronze in the usual way and are provided with a casting forming cavity indicated at C of any ornamental shape and design. For convenience of illustration, this is shown in the form of a curved leg suitable for a lamp base and having the parting line in a plane. Other shapes may, of course, be employed.

The bronze mold is provided with a core cavity 22 of circular cross section and having a large diameter part 22a and a small diameter part 22b. As here shown, this cavity extends the entire length of the adjacent portion of the mold so that the mold has, in effect, a cylindrical opening. The casting forming cavity C extends to the core cavity, as indicated at G to form a gate opening from the casting forming cavity to the core cavity. The large diameter part 22a of the core opening is preferably cylindrical, as shown in the drawings and a portion of it extends to the casting cavity, as indicated at 22b. It may taper slightly, if desired.

In the drawings, the core, as shown, is made of two parts. It has a central shaft-like element 25 and an outer tubular part 26. The shaft 25 is preferably turned to have a conically shaped collar, as indicated at 27, a shoulder 28, and cylindrical portions 29, 30, and 31. The portions 29 and 30 of the shaft 25 fit the smaller diameter part 22b of the core opening. If desired, this portion of the core may have a single diameter instead of being stepped. The diameter of this part of the shaft 25 is preferably smaller than the diameter of the part 31.

The outer sleeve 26 is cylindrical and has an outside diameter the same as the portion 22a of the core cavity. It is drilled to fit the portion 31 of the shaft 25 and is provided with a conical cavity 32 of the same taper as the conical collar 27 on the shaft 25. When these two parts are turned and put together, they fit accurately and are secured together by a pin 33 which extends through both core portions, as indicated in the drawings. This insures the angular relation of the two core parts, and inasmuch as the mold halves are provided with grooves, indicated at 34, to receive this pin, it is obvious that the position of the core in the mold is predetermined accurately.

After the core parts have thus been assembled, they are separated and the shaft put in a milling machine. Using the drilling for the pin 33 as a point of reference, a portion of the collar 27 is milled away to form a slot, as indicated at 35 or 36. The slot 35 occupies ⅓ of the circumference and has radial side walls 35a and 35b, 120° from one another. The milling is preferably controlled so that the inner wall of the slot tapers slightly, as indicated at 35c, for purpose to be set forth later herein. If desired, the opposite side of the shaft 25 may be milled to provide the slot 36 which is shown in Fig. 3 as extending through 180°. When the core parts are assembled as indicated in Fig. 1, the pocket formed by the slot is opposite the gate G. Where the casting is to have a lug intended to occupy ¼ of the circle or ⅕ or ⅙ of the circle, the milling cutter is adjusted so that the angle between the sides of the pocket is the desired amount. A single core shaft may be provided with these three sizes of slot and to form the three sizes of pocket used with the same outer sleeve 26 so that one can with the same mold and outer core sleeve and two core shafts make up all desired forms of mounting lug thereby rendering it unnecessary to go to the expense of making a number of molds and cores.

In the mold shown in Fig. 1, provision is made at 40 for a plug adapted to carry a bolt 41 whose head may be embedded in the casting formed, whereby a threaded stud is carried by the casting. The metal is poured in through the opening indicated at 42. In Fig. 5, two castings, made as contemplated herein, are indicated at 50. These castings have lugs 51 with tapered conical surfaces, indicated at 52, and radial side walls 53 and 54. The inside surface of the lug is indicated at 55. Near the tip, this surface is bevelled or chamfered, as indicated at 55a. The shape of this lug and its dimensions are accurately determined by the pocket in the core. The gate portion of the casting cavity G forms a lateral extension 56 on the casting which connects the lug 51 with the body 50 of the casting. This gate portion, as is clear from Fig. 8, occupies a space of 60°, or less, so that it will not be wider than the lugs for a six-arm structure. The portion of the casting 50 opposite the lug 51 and formed by the cylindrical outer surface of the core is indicated at 57.

The assembly of the castings with a central body is also indicated at Fig. 5 where a cylindrical body member is indicated at 60. It is threaded at 61 to receive a tube or rod 62. The outside diameter of the body member 60 is the same as that of the core 22a (allowance being made for shrinkage) and the angle of taper of the inner part 63 of this body member is the same as that of the taper 32 of the sleeve 26.

In assembling the parts, the body member 60 is threaded onto the shaft or rod 62 and the necessary number of castings brought into position so that the lugs enter the tapered opening in the body member. They nest around the rod and are easily inserted in place on account of the taper indicated at 55a produced by the portion 35c of the core. Washers 64 and 65 complete the assemblage. Tightening the nut will force the parts into a very close and intimate contact and will provide an exceedingly tight assemblage in which the conical surfaces of the lugs and the cylindrical surfaces of the castings bear on the inner and outer surfaces of the cylindrical body member 60. The arms are held so securely that they cannot be twisted out of place in any direction.

In Figs. 9 and 10 other forms of molds are indicated. In Fig. 9 the casting to be produced in the casting cavity C' is a leg or arm of considerably different shape than that to be had by the mold shown in Fig. 1. The core parts 25, 26 may be exactly the same structure as used with the mold in Fig. 1. In the form shown in Fig. 10, the cavtiy C" extends below the lug forming pocket 35 of the core.

It is obvious that the invention may be embodied in many forms and constructions and I wish it to be understood that the particular forms shown are but several of the many forms. Various modifications and changes being possible, I do not otherwise limit myself in any way with respect thereto.

What is claimed is:

1. A metal core for use in permanent molds, comprising two interfitting parts, one part having a recess with a conically tapered portion, the other having a conically tapered collar to fit the tapered portion of the recess, a portion of said collar being removed to form a pocket closed at the bottom and having radial side walls and a conically tapered outer wall, and means to secure the two parts together.

2. A metal core as claimed in claim 1, wherein the inner part is in the form of a rod having portions of reduced diameter extending away from the tapered collar, and the outer portion is carried on the reduced diameter portion toward which the collar tapers.

3. A metal core as claimed in claim 1, wherein the collar has a plurality of cut out portions of different angular extent to produce pockets of differing angular extent so that the same core may be used for making castings with different sized members formed in the selected pocket.

4. A metal core for use in permanent molds, comprising, an inner shaft having a conically tapered collar provided with a cut out portion extending from the large diameter end thereof and having side walls in radial planes, and an outer sleeve fitting the shaft and collar except opposite the cut out portion where it is of the same taper as the portions which fit the tapered collar, and means to secure the shaft and sleeve together.

5. A metal core as claimed in claim 4, wherein the end of the sleeve having the tapered opening is opposite the large end of the collar.

6. Molding apparatus comprising two metal mold halves which, when assembled together, have a cylindrical opening extending therethru, the opening having portions of two diameters, the mold halves also forming a casting receiving cavity with a lateral extension to the smaller diameter part of the cylindrical opening, a metal core, said core having an inner part and an outer part, the outer part fitting the larger diameter portion of the cylinrical opening in the mold halves and abutting a shoulder at one end and the inner part extending from the outer part and fitting the smaller diameter portion, the core having a longitudinally extending pocket opening at the shoulder abutting end thereof and opposite the lateral extension of the mold cavity for forming a lug spaced from the body of the casting, and means to secure the core in between the mold halves in fixed angular position about the axis of the cylindrical opening.

7. Molding apparatus as claimed in claim 6, wherein said pocket has a conically tapered outer wall, and side walls angled to lie in radii of the arc defined by the curvature of said outer wall.

8. Molding apparatus as claimed in claim 6, wherein the core has two such pockets on opposite sides of the axis of the said outer core part of a different angular width so that the core may be placed in either of two positions whereby castings may be made from the same mold halves and core, but having lugs of different angular width.

9. Molding apparatus as claimed in claim 6, wherein the casting forming cavity continues from said lateral extension alongside a part of the large diameter portion of the core so that the portion of the casting opposite the lug is cylindrical.

10. Molding apparatus for constructing castings of different ornamental shape and size but having mounting means of standardized dimension, comprising a plurality of pairs of mold halves provided with casting forming cavities of variant design for the particular ornamental casting to be produced therein, each pair having a standardized core cavity therein and a standardized gate from the casting cavity into the core cavity, and an interchangeable core adapted for use with any pair of mold halves, said core, having a pocket to receive metal flowing in through said gate whereby all castings formed will have standardized lugs.

11. Molding apparatus as claimed in claim 10, wherein the casting cavities also extend alongside the core cavities adjacent said pocket and the core provides a uniform shape for all the castings opposite said standardized lugs.

12. Molding apparatus as claimed in claim 10, wherein the core cavity and core are of circular cross section and the core pocket is a portion of a cone between two radial surfaces that lie in radii of the circle defined by the curvature of the core cavity.

OTTO J. GERSCHEFSKI.